Figure 5:
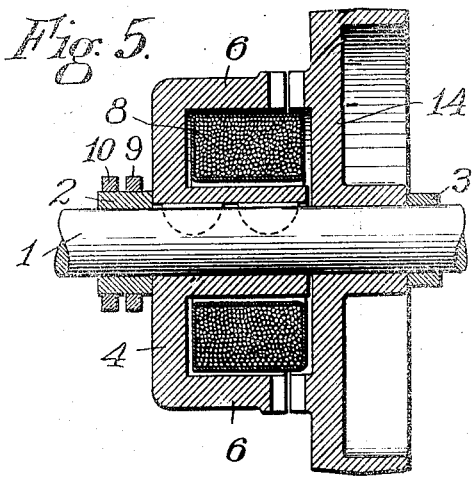

A. W. WHITCOMB.
MAGNETIC CLUTCH.
APPLICATION FILED MAY 22, 1911.
1,139,005.
Patented May 11, 1915.
2 SHEETS—SHEET 1.
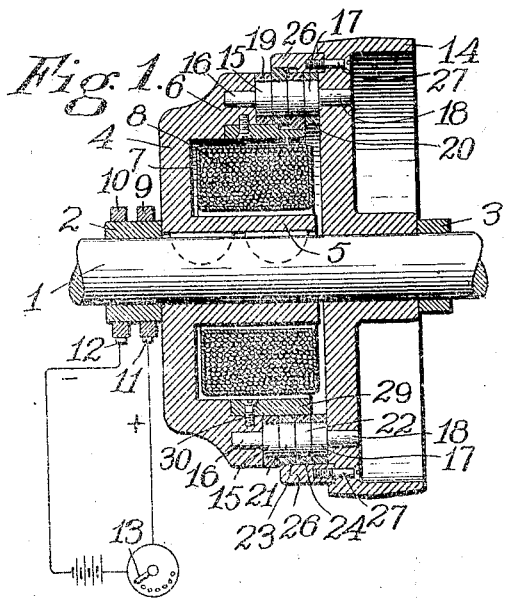
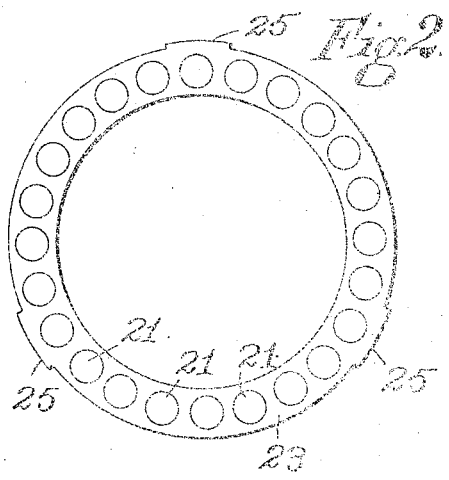
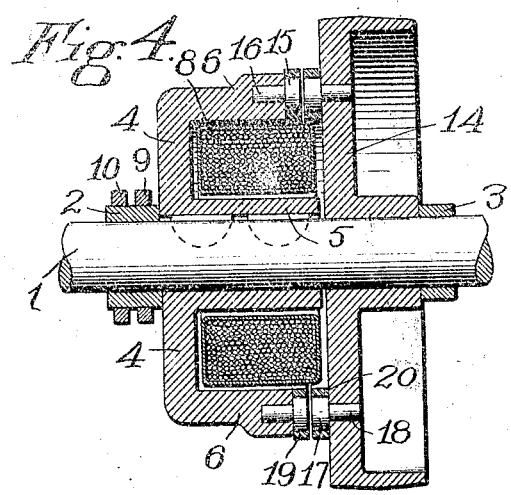
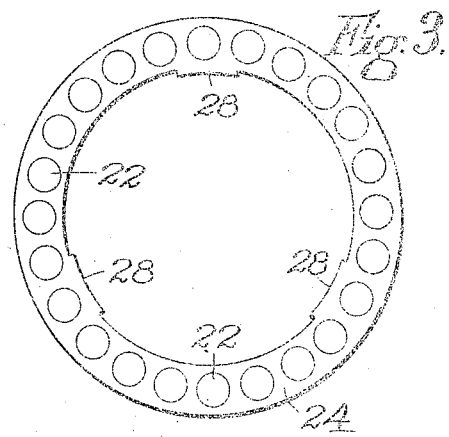
Witnesses.
R. D. Tolman.
Penelope Cumberbach.
Inventor
Alonzo W. Whitcomb
By Rufus B. Fowler
Attorney

A. W. WHITCOMB.
MAGNETIC CLUTCH.
APPLICATION FILED MAY 22, 1911.

1,139,005.

Patented May 11, 1915.
2 SHEETS—SHEET 2.

Witnesses.
R. D. Holman.
Penelope Cumberbach.

Inventor
Alonzo W. Whitcomb.
By Rufus B. Fowler
Attorney

UNITED STATES PATENT OFFICE.

ALONZO W. WHITCOMB, OF WORCESTER, MASSACHUSETTS.

MAGNETIC CLUTCH.

1,139,005.

Specification of Letters Patent.

Patented May 11, 1915.

Application filed May 22, 1911. Serial No. 628,607.

*To all whom it may concern:*

Be it known that I, ALONZO W. WHITCOMB, a citizen of the United States, residing at Worcester, in the county of Worcester and Commonwealth of Massachusetts, have made a new and useful Invention in Magnetic Clutches, of which the following is a specification accompanied by drawings, forming a part of the same.

The object of my present invention is to provide a clutch in which the clutch members may be engaged and disengaged through the direct agency of an electromagnet by the opening and closing of an electric circuit, and I accomplish this object by the construction and arrangement of parts as hereinafter described and pointed out in the annexed claims.

In the accompanying drawings I have represented a clutch of the type known as a friction clutch, and embodying my present invention in what I deem a preferable form.

Referring to the drawings, Figure 1 represents a clutch embodying my invention in diametrical sectional view. Figs. 2 and 3 are detached views of the intermediate friction rings, and Figs. 4 to 6, inclusive, represent modified forms of construction of a clutch embodying certain features of my invention.

Similar reference characters refer to similar parts in the different views.

Referring to Fig. 1 of the drawings, 1 denotes a rotatable shaft to which the collars 2 and 3 are attached. Carried by the shaft 1 is a disk 4 provided with a hub 5 which is attached to the shaft 1, and a peripheral flange 6 having an annular chamber 7 inclosed between the hub 5 and the flange 6. The annular chamber 7 is open upon one side and incloses a coil of wire 8, having its opposite ends connected with the rings 9 and 10 carried upon the collar 2 and revolving in contact with the brushes 11 and 12, forming part of an electric circuit controlled by a switch lever 13 of a rheostatic control. When the electric circuit is closed through the coil of wire 8, the peripheral flange 6 becomes an electromagnet capable of exerting a magnetic attraction upon an armature brought within its magnetic field. In the present instance the armature 14 consists of a pulley capable of turning loosely on the shaft 1 and normally held within the magnetic field by means of the collar 3. The peripheral flange 6 is provided with a series of disks 15 provided with stems 16 inserted in the flange 6. Similar disks 17 are carried by the armature 14 and held in place by stems 18 entering holes in the armature. The disks 15 are contained in holes in an annular plate 19 of brass or other nonmagnetic material, and the disks 17 are similarly contained in holes in an annular plate 20 of brass or other nonmagnetic material. Inserted between the disks 15 and 17 and the nonmagnetic plates 19 and 20 are disks 21 and 22 of iron or other magnetic material, said disks 21 and 22 being inclosed in the annular plates 23 and 24 of brass or other nonmagnetic material. The plate 23 with the disks 21 inclosed therein, is shown in detached view in Fig. 2, and is provided on its outer periphery with the projections 25 which are inserted in grooves in an annular sleeve 26, attached to the armature 14 by screws 27, causing the plate 23 and disks 21 to be connected with the armature 14 to rotate therewith. The annular plate 24 with the disks 22 inclosed therein, is shown in detached view in Fig. 3, and is provided on its inner side with the projections 28 which engage grooves in an annular sleeve 29, attached to the peripheral flange 6 by screws 30 by which the plate 24 and disks 22 are connected with the flange 6 to rotate therewith.

In the operation of my magnetic clutch in the form shown in Fig. 1, rotary motion is imparted through the shaft 1 to the disk 4 and flange 6, while the armature 14 is normally in a state of rest. When the electric circuit is closed through the coil 8, the electromagnet surrounding the coil becomes energized and the magnetic lines of force passing through the disks 15, 17, 21 and 22 cause the rotative movement of the magnet to be imparted to the armature 14, from which power can be transferred by any suitable means, such as a wrapping connection with the face of the armature. The several disks 15, 17, 21 and 22 constitute individual opposing magnetic faces, each surrounded by nonmagnetic material. Until the armature revolves at the same speed as the magnet a slipping action will occur between the disks carried by the magnet and the disks carried by the armature. While the slipping action continues each of the disks carried by the electromagnet and constituting the driving disks will be continually moving over the driven disks or those carried by the armature. Magnetic force is thereby applied to draw the armature directly toward the magnet and also to impart a rotative movement to the armature. This result I have found to be due to the spacing of the disks one from the other, providing short gaps between the magnetic faces of both the electromagnet and the armature. By filling the spaces with a nonmagnetic material, such as brass, electric currents are induced by the slipping of the disks past each other which increases the power of the electromagnet. I further confine the lines of magnetic force passing through the armature 14 to the magnetic disks which are brought into alinement by means of the nonmagnetic plates already mentioned, and also by the inclosing nonmagnetic sleeves 26 and 29. While I consider the construction shown in Fig. 1 an efficient embodiment of my present invention, I have shown in Figs. 4 to 6 inclusive, certain modifications in which independent features of my invention are separately embodied.

In Fig. 4 the electromagnet comprises a disk 4, a hub 5 by which it is attached to a rotating shaft 1, and a peripheral flange 6 inclosing between the flange 6 and hub 5 the wire coil 8. The flange 6 is provided with a series of disks 15 provided with stems 16, and the armature 14 is provided with a series of disks 17 having stems 18, the concentric rows of disks 15 and 17 being inclosed in annular plates 19 and 20 corresponding to the same parts as shown in Fig. 1. The annular plates 23 and 24 with their disks 21 and 22, shown in Figs. 2 and 3, and the sleeves 26 and 29, all shown in Fig. 1, are omitted in Fig. 4.

Figure 6:
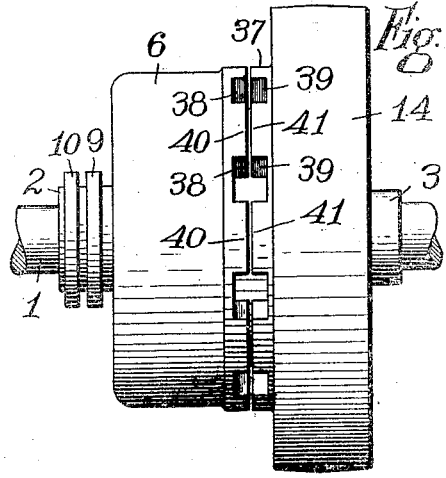

In Fig. 5 I have shown in sectional view the clutch represented in elevation in Fig. 6, in which the armature 14 is provided with a concentric flange 37. The flange 37 opposes the flange 6 of the electromagnet. The flanges 6 and 37 are provided with gaps or air spaces 38, 39, forming between them opposing magnetic faces 40 on the electromagnet and 41 on the armature. As the magnetic faces 40 are rotated a magnetic attraction is exerted upon the armature 14 and in addition rotative force is applied to the armature, whenever a slipping action occurs between the faces 40 and 41.

In the forms of clutches represented in the accompanying drawings the electromagnet is made the driving member and the armature the driven member, but these conditions may obviously be reversed.

By means of the collar 3 the armature 14 is normally held within the field of the electromagnet but in such position as to allow the free slipping of the frictional or clutch faces except when the electromagnet is energized.

I claim,

1. A magnetic clutch comprising two opposing clutching members, one of said members consisting of an electromagnet and the other of said members consisting of an armature therefor, each of said members having an annular series of spaced frictional surfaces, with the spaces filled with nonmagnetic metal.

2. A magnetic clutch comprising two rotatable clutching members, each member having a concentric series of frictional magnetizable surfaces about its axis, said two series of surfaces being arranged in opposed relation and each surface in each series being surrounded by nonmagnetic material, and means for magnetically energizing one of said clutching members at will.

3. A magnetic clutch, comprising two rotatable clutching members, consisting of an electromagnet and an armature therefor, annular plates of nonmagnetic material interposed between said members, and a series of plates of magnetic material inserted in said nonmagnetic plates.

4. A magnetic clutch comprising two opposing clutching members, one of said members consisting of an electromagnet and the other of said members consisting of an armature therefor, each of said members being provided with a concentric series of spaced frictional magnetizable surfaces, the two concentric series of surfaces being engageable with each other.

5. A magnetic clutch, comprising two rotatable members consisting of an electromagnet and an armature therefor, means for normally holding said armature within the magnetic field, means for energizing said electromagnet at will, a series of magnetic plates carried by said electromagnet having their edges surrounded by nonmagnetic metal, a series of magnetic plates carried by said armature having their edges surrounded by nonmagnetic metal, annular plates of nonmagnetic metal interposed between said series of magnetic plates and provided with a series of spaced magnetic plates exposed on opposite sides of said annular plates, a sleeve of nonmagnetic metal carried by one of the rotatable members, a second sleeve of nonmagnetic metal carried by the other rotatable member, said sleeves overlapping said annular plates and alternately connected therewith by spline connections.

ALONZO W. WHITCOMB.

Witnesses:
Penelope Comerbage,
Nellie Whalen.